US012340728B2

(12) United States Patent
Wu et al.

(10) Patent No.: US 12,340,728 B2
(45) Date of Patent: Jun. 24, 2025

(54) METHOD FOR CONTROLLING OFFSET VOLTAGE IN DISPLAY DEVICE, DISPLAY DEVICE, AND STORAGE MEDIUM

(71) Applicants: Beijing ESWIN Computing Technology Co., Ltd., Beijing (CN); Hefei ESWIN Computing Technology Co., Ltd., Anhui (CN)

(72) Inventors: Jiajhang Wu, Beijing (CN); Jangjin Nam, Beijing (CN); Dongmyung Lee, Beijing (CN); Minsung Kim, Beijing (CN)

(73) Assignees: BEIJING ESWIN COMPUTING TECHNOLOGY CO., LTD., Beijing (CN); HEFEI ESWIN COMPUTING TECHNOLOGY CO., LTD., Anhui (CN)

( * ) Notice: Subject to any disclaimer, the term of this patent is extended or adjusted under 35 U.S.C. 154(b) by 282 days.

(21) Appl. No.: 18/071,177

(22) Filed: Nov. 29, 2022

(65) Prior Publication Data

US 2023/0169911 A1 Jun. 1, 2023

(30) Foreign Application Priority Data

Nov. 29, 2021 (CN) ......................... 202111435843.0

(51) Int. Cl.
*G09G 3/20* (2006.01)
*G09G 3/36* (2006.01)

(52) U.S. Cl.
CPC ......... *G09G 3/2096* (2013.01); *G09G 3/3614* (2013.01); *G09G 3/20* (2013.01);
(Continued)

(58) Field of Classification Search
CPC ...... G09G 3/20; G09G 3/2096; G09G 3/3614; G09G 3/3685; G09G 3/3688;
(Continued)

(56) References Cited

U.S. PATENT DOCUMENTS

2007/0257897 A1 11/2007 Tang
2008/0084409 A1 4/2008 Rao
(Continued)

FOREIGN PATENT DOCUMENTS

CN 101414451 A 4/2009
CN 101707049 A 5/2010
(Continued)

OTHER PUBLICATIONS

Search Report dated Oct. 21, 2022 from the Office Action for Chinese Application No. 202111435843.0 issued Oct. 28, 2022, 3 pages.
Search Report dated Dec. 16, 2022 from the Office Action for Chinese Application No. 202111435843.0 Jan. 11, 2023, pp. 1-2.

*Primary Examiner* — Amr A Awad
*Assistant Examiner* — Saifeldin E Elnafia
(74) *Attorney, Agent, or Firm* — Ladas & Parry, LLP

(57) ABSTRACT

The present application provides a method for controlling an offset voltage in a display device, a display device and a storage medium. The method for controlling an offset voltage in a display device comprises: generating a chopper signal based on at least one of a data output control signal and a polarity inversion control signal; and, controlling, according the chopper signal, the polarity of an offset voltage of an operational amplifier in the display device, so that the offset voltage is equivalently eliminated within at least one of a design space range and a design time range. By using the control method of the present application,
(Continued)

without using large-size transistors and providing more signals, the display effect can be ensured and the size of the chip can also be reduced.

15 Claims, 8 Drawing Sheets

(52) U.S. Cl.
CPC ......... *G09G 3/3685* (2013.01); *G09G 3/3688* (2013.01); *G09G 2310/0254* (2013.01); *G09G 2310/0291* (2013.01); *G09G 2320/0247* (2013.01)

(58) Field of Classification Search
CPC ... G09G 2310/0254; G09G 2310/0291; G09G 2320/0247
See application file for complete search history.

(56) References Cited

U.S. PATENT DOCUMENTS

| | | | | |
|---|---|---|---|---|
| 2008/0143665 | A1 | 6/2008 | Nishimura | |
| 2008/0191912 | A1* | 8/2008 | Shin | H03M 1/667 341/122 |
| 2008/0259017 | A1* | 10/2008 | Wright | H03K 19/00369 345/94 |
| 2009/0102777 | A1 | 4/2009 | Izumikawa et al. | |
| 2013/0069717 | A1 | 3/2013 | Kim et al. | |
| 2020/0286417 | A1* | 9/2020 | Chae | G09G 3/20 |

FOREIGN PATENT DOCUMENTS

| | | | |
|---|---|---|---|
| CN | 102081896 | A | 6/2011 |
| CN | 103021351 | A | 4/2013 |

* cited by examiner

METHOD FOR CONTROLLING OFFSET VOLTAGE IN DISPLAY DEVICE, DISPLAY DEVICE, AND STORAGE MEDIUM

CROSS-REFERENCES TO RELATED APPLICATIONS

The application claims the benefit of Chinese Patent Application No. 202111435843.0 filed on Nov. 29, 2021 in the China National Intellectual Property Administration, the disclosure of which is incorporated herein by reference in its entirety.

TECHNICAL FIELD

The present application relates to the technical field of display, and in particular to a method for controlling an offset voltage in a display device, a display device and a storage medium.

BACKGROUND

At present, the picture quality of the screen display is highly related to the offset voltage of the operational amplifier. The size of the transistor in the operational amplifier can affect the size of the offset voltage of the operational amplifier. For example, the offset voltage of the operational amplifier can be reduced by increasing the size of the transistor.

In the prior art, the operational amplifier in the display device adopts a large-size transistor to reduce the offset voltage of the operational amplifier; however, the large-size transistor will increase the size of the whole operational amplifier, so that both the size of the source driver and the size of the display device are increased.

Therefore, how to provide a control method which can eliminate the offset voltage of the operational amplifier without using large-size transistors is a problem to be solved by those skilled in the art.

SUMMARY

In a first aspect, an embodiment of the present application provides a method for controlling an offset voltage in a display device, including:

generating a chopper signal based on at least one of a data output control signal and a polarity inversion control signal; and controlling, according to the chopper signal, the polarity of an offset voltage of an operational amplifier in the display device, so that the offset voltage is equivalently eliminated within at least one of a design space range and a design time range.

In a second aspect, an embodiment of the present application provides a display device, including a source driver and a display panel;

the source driver includes an output buffer unit, which is electrically connected to the display panel; and the output buffer unit includes a control unit and an operational amplifier, the control unit being electrically connected to the operational amplifier, the control unit being configured to execute the method for controlling an offset voltage in a display device provided in the first aspect.

In a third aspect, an embodiment of the present application provides a non-transitory computer-readable storage medium having computer programs stored thereon that are executed by a computer to implement the method for controlling an offset voltage in a display device provided in the first aspect.

Additional aspects and advantages of the present application will be partially appreciated and become apparent from the following description, or will be well learned from the practices of the present application.

BRIEF DESCRIPTION OF THE DRAWINGS

The above and/or additional aspects and advantageous of the present application will become apparent and be more readily appreciated from the following description of embodiments with reference to the accompanying drawings, in which.

Figure 1:
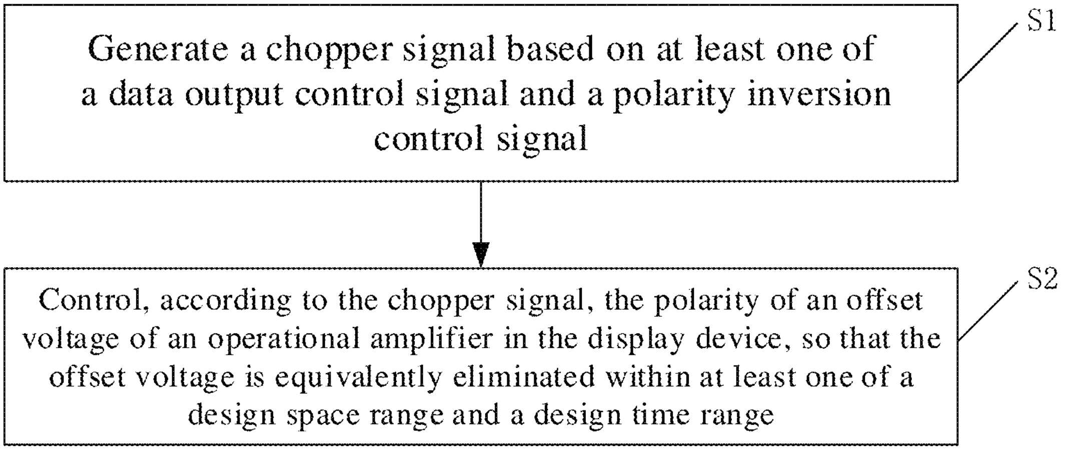
FIG. 1 is a flowchart of a method for controlling an offset voltage in a display device according to an embodiment of the present application.

in which:

100: source driver; 200: timing sequence controller; 300: gate driver; 400: display panel; 10: output buffer unit; 1: control unit; 11: determination unit; 12: logic unit; 121: selector; 122: first trigger; 123: second trigger; and 2: operational amplifier.

DETAILED DESCRIPTION

The present application will be described in detail below, and the examples in the embodiments the present application are illustrated in the accompanying drawings throughout which the same or similar reference numerals refer to the same or similar components or components having the same or similar functions. In addition, if the detailed description of the well-known technologies is unnecessary for the illustrated features of the present application, it will be omitted. The embodiments to be described below with reference to the accompanying drawings are exemplary, and are only used for explaining the present application, rather than being construed as limiting the present application.

It should be understood by those skilled in the art that, unless otherwise defined, all terms (including technical and scientific terms) used herein have the same meaning as commonly understood by those skilled in the art to which the present application belongs. It should be further understood that terms, such as those defined in commonly used dictionaries, should be interpreted as having a meaning that is consistent with their meanings in the context of the prior art and will not be interpreted in an idealized or overly formal sense unless expressly so defined herein.

It should be understood by those skilled in the art that singular forms "a", "an", "the" and "said" used herein may include plural forms as well, unless otherwise stated. It should be further understood that the terms "comprise/comprising" used in the specification of the present application specify the presence of the stated features, integers, steps, operations, elements and/or components, but is not exclusive of the presence or addition of one or more other features, integers, steps, operations, elements, components and/or combinations thereof. It should be understood that, when an element is referred to as being "connected to" or "coupled to" another element, this element can be directly connected or coupled to other elements or provided with intervening elements therebetween. In addition, "connection" or "coupling" as used herein may include wireless connection or coupling. As used herein, the term "and/or" includes all or any of one or more associated listed items or all combinations thereof.

The inventor of the present application has found through researches that, in addition to using large-size transistors to reduce the offset voltage of the operational amplifier, the offset voltage of the operational amplifier may also be compensated by a chopper method, so that the equivalent offset voltage can be further reduced without additionally increasing the size of transistors. However, if the chopper method is employed in the source driving integrated circuit (IC) of the display device, it is required that the display device can correspondingly provide more line signals and frames, e.g., TP (data output control signals), GSP (frame start signals), etc.

At present, in some interface systems, line signals and frame signals cannot be simultaneously provided for the source driving IC for use. For example, a mini low voltage differential signal (i.e., mini-LVDS, mLVDS) interfaces can only provide two signals, i.e., POL (polarity inversion control signal) and TP (data output control signal). So, in the line inversion system, that is, when the pixel driving mode is line inversion driving, the frame signal cannot be extracted. Therefore, in the absence of the frame signal, the offset voltage cannot be completely compensated by the chopper operation, resulting in noise on the screen.

The method for controlling an offset voltage in a display device, the display device and the storage medium provided by the present application are intended to solve the above technical problems in the prior art.

The technical solutions of the present application and how to solve the above technical problems by the technical solutions of the present application will be described below in detail by specific embodiments. The following specific embodiments may be combined with each other, and the same or similar concepts or processes will not be repeated in some embodiments. The embodiments of the present application will be described below with reference to the accompanying drawings.

An embodiment of the present application provides a method for controlling an offset voltage in a display device, which is applied to a display device. The display device may be a mobile phone, a tablet computer, a TV set, a display, a notebook computer, a digital photo frame, a navigator or any other products or components with a display function. As shown in FIG. 1, the method for controlling an offset voltage in a display device includes the following steps S1 to S2.

At S1, a chopper signal is generated based on at least one of a data output control signal and a polarity inversion control signal.

At S2, the polarity of an offset voltage of an operational amplifier in the display device is controlled according to the chopper signal, so that the offset voltage is equivalently eliminated within at least one of a design space range and a design time range.

In the method for controlling an offset voltage in a display device provided in the embodiment of the present application, the polarity of the offset voltage of the operational amplifier in the display device is controlled by using the chopper signal generated based on at least one of the data output control signal and the polarity inversion control signal, so that the offset voltage can be equivalently eliminated within at least one of the design space range and the design time range, without using large-size transistors and providing more signals. Accordingly, the display effect can be ensured, and the size of the chip can also be reduced. Thus, the source driver in the display device can be suitable for various interfaces, e.g., mLVDS interfaces.

In some embodiments, the generating a chopper signal based on at least one of a data output control signal and a polarity inversion control signal includes:

- determining, based on the data output control signal and the polarity inversion control signal, a pixel driving mode signal in the display device, the pixel driving mode signal including a first potential and a second potential; and
- generating a chopper signal based on the pixel driving mode signal and at least one of the data output control signal and the polarity inversion control signal.

The control method provided in this embodiment can adapt to different pixel driving modes (e.g., frame inversion driving or line inversion driving), and can equivalently eliminate the offset voltage within at least one of the design space scope and the design time scope in different pixel driving modes, thereby ensuring the display effect.

Optionally, the first potential may be a high potential or a low potential; and correspondingly, the second potential may be a low potential or a high potential. For example, the first potential may be a digital potential of 1; and correspondingly, the second potential may be a digital potential of 0. Of course, the first potential may also be 0.8 or 0.7; and correspondingly, the second potential may also be 0.2 or 0.1. This will not be specifically limited in the present application.

Optionally, when the pixel driving mode signal is the first potential, the pixel driving mode is frame inversion driving; and, when the pixel driving mode signal is the second potential, the pixel driving mode is line inversion driving.

In some embodiments, the generating a chopper signal based on at least one of a data output control signal and a polarity inversion control signal further includes:

- determining the frequency of the polarity inversion control signal based on the data output control signal and the polarity inversion control signal.

In accordance with this embodiment of the present application, the frequency of the polarity inversion control signal can be determined. When the pixel driving mode signal is frame inversion driving, the frequency of the polarity inversion control signal can be used as GSP (frame start signal), so that the frame-to-frame frequency is obtained, and chopper control is realized according to the frame-to-frame frequency. Accordingly, the offset voltage in the display device is equivalently eliminated within at least one of the design space range and the design time range, and the display effect is ensured.

In some embodiments, when the pixel driving mode signal is the first potential, the polarity of the offset voltage of the operational amplifier in the display device is controlled based on a frame chopper signal triggered to be generated by the polarity inversion control signal, and the polarity of the offset voltage of the operational amplifier in the display device is controlled based on a line chopper signal triggered to be generated by the data output control signal.

When the pixel driving mode signal is the second potential, the polarity of the offset voltage of the operational amplifier in the display device is controlled based on a line chopper signal triggered to be generated by the polarity inversion control signal.

When the pixel driving mode signal is the first potential, the pixel driving mode is frame inversion driving. By controlling the polarity of the offset voltage of the operational amplifier in the display device according to the frame chopper signal triggered to be generated by the polarity inversion control signal, the offset voltage is equivalently eliminated within the design time range. By controlling the polarity of the offset voltage of the operational amplifier in the display device according to the line chopper signal triggered to be generated by the data output control signal, the offset voltage is equivalently eliminated within the design space range.

Optionally, the equivalent elimination of the offset voltage within the design time range and the equivalent elimination of the offset voltage within the design space range may be performed simultaneously to further ensure the display effect.

When the pixel driving mode signal is the second potential, the pixel driving mode is line inversion driving. By controlling the polarity of the offset voltage of the operational amplifier in the display device according to the line chopper signal triggered to be generated by the polarity inversion control signal, the offset voltage is equivalently eliminated within both the design time range and the design time range, thereby ensuring the display effect.

In some embodiments, the controlling, based on a frame chopper signal triggered to be generated by the polarity inversion control signal, the polarity of the offset voltage of the operational amplifier in the display device when the pixel driving mode signal is the first potential includes:

when the pixel driving mode signal is the first potential, controlling, based on the frame chopper signal triggered to be generated by the polarity inversion control signal and according to the frequency of the polarity inversion control signal, the polarity of the offset voltage of the operational amplifier in the display device, so that the polarity of the offset voltage of the operational amplifier is opposite when data signals of pixels at the same position in different frames have the same polarity.

When the pixel driving mode signal is the first potential, the pixel driving mode is frame inversion driving. In the frame inversion driving system, if the polarity inversion control signal POL may be used as GSP (frame start signal), the frequency of the polarity inversion control signal is the frequency of the GSP (frame start signal), i.e., the frame frequency. The frame frequency, also known as frame rate, is the frequency (rate) at which the bitmap image continuously appears on the display in unit of frames and is represented by Hertz (Hz).

In this embodiment, when the pixel driving mode is frame inversion driving, the polarity of the offset voltage of the operational amplifier in the display device is controlled by using the polarity inversion control signal as the GSP (frame start signal) and the frequency of the polarity inversion control signal as the frame frequency. Thus, without using large-size transistors and providing more signals, the offset voltage in the display device is equivalently eliminated, and the display effect is ensured.

In some embodiments, the controlling, based on a frame chopper signal triggered to be generated by the polarity inversion control signal, the polarity of the offset voltage of the operational amplifier in the display device when the pixel driving mode signal is the first potential includes:

when the pixel driving mode signal is the first potential, changing, based on the frame chopper signal triggered to be generated by the polarity inversion control signal and according to the frequency of the polarity inversion control signal, the polarity of the offset voltage of the operational amplifier in the display device in unit of two frames.

Figure 2:
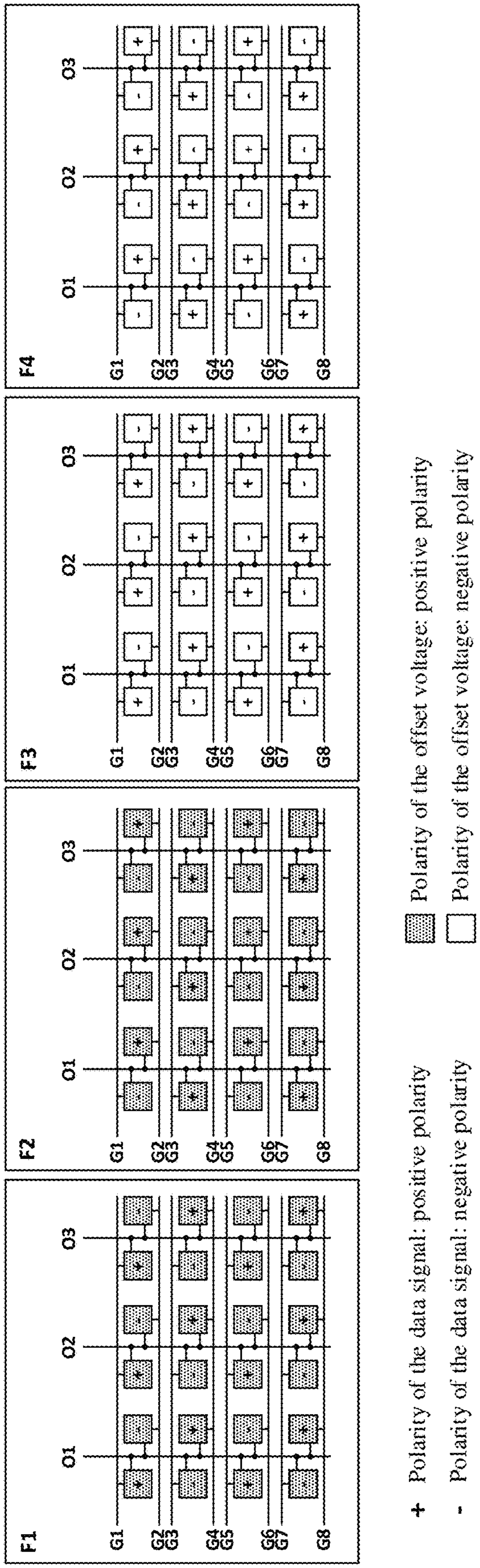
FIG. 2 is a schematic diagram of changing the polarity of the offset voltage in unit of two frames based on the triggering of POL when a pixel driving mode is frame inversion driving, according to an embodiment of the present application.

As shown in FIG. 2, the pixel driving mode in FIG. 2 is frame inversion driving, that is, the data signals of two adjacent pictures have opposite polarities. Based on the triggering of POL (polarity inversion control signal), the polarity of the offset voltage is changed in unit of two frames.

In FIGS. 2, F1, F2, F3 and F4 represent the first frame, the second frame, the third frame and the fourth frame, respectively. It can be seen from FIG. 2 that the data signals of pixels in F1 and F2 have opposite polarities, the data signals of pixels in F2 and F3 have opposite polarities, and the data signals in pixels of F3 and F4 have opposite polarities. G1 to G8 represent the first grid line to the eighth grid line, and O1 to O3 represent the first data line to the third data line.

In FIG. 2, "+" represents that the polarity of the data signal of the pixel is positive ■ polarity, "−" represents that the polarity of the data signal of the pixel is negative polarity, ▩ represents that polarity of the offset voltage is positive polarity, and □ represents that the polarity of the offset voltage is negative polarity. The positive polarity and the negative polarity are relative, the absolute value of the numerical value of the data signal is equal, and the absolute value of the voltage value of the offset voltage is equal.

With reference to FIG. 2, the offset voltage of F1 and the offset voltage of F2 have the same polarity, and the offset voltage of F3 and the offset voltage of F4 have the same polarity. The offset voltage of "F1 and F2" and the offset voltage of "F3 and F4" have opposite polarities, i.e., the polarity of the offset voltage of the operational amplifier in the display device is changed in unit of two frames.

It can be seen from FIG. 2 that, in the pictures of F1 and F3, when the data signals of pixels have the same polarity, the polarity of the offset voltage is opposite; and in the pictures of F2 and F4, when the data signals of pixels have the same polarity, the polarity of the offset voltage is opposite. By chopper control, the offset voltage is equivalently eliminated within the design time range, that is, the offset voltage is balanced within the design time range, thereby realizing the temporal balancing effect and ensuring the display effect.

Of course, in some other embodiments, when the pixel driving mode signal is the first potential, that is, when the pixel driving mode is frame inversion driving, the polarity of the offset voltage of the operational amplifier in the display device is changed in unit of another number of frames (e.g., one frame, three frames, four frames, five frames, six frames, etc.) based on the frame chopper signal triggered to be generated by the polarity inversion control signal and according to the frame-to-frame frequency, as long as the polarity of the offset voltage of the operational amplifier is opposite when the data signals of pixels at the same position in different frames have the same polarity. This will not be limited in the present application.

In some embodiments, the controlling, based on a line chopper signal triggered to be generated by the data output control signal, the polarity of the offset voltage of the operational amplifier in the display device when the pixel driving mode signal is the first potential includes:

when the pixel driving mode signal is the first potential, controlling, based on the line chopper signal triggered to be generated by the data output control signal, the polarity of the offset voltage of the operational amplifier in the display device, so that the polarity of the offset voltage of the operational amplifier is opposite when the data signals of pixels in different rows in the same frame have the same polarity.

In this embodiment, when the pixel driving mode is frame inversion driving, the polarity of the offset voltage of the operational amplifier in the display device is controlled according to the line chopper signal triggered to be generated by the data output control signal. Thus, without using large-size transistors and providing more signals, the offset voltage in the display device is equivalently eliminated, and the display effect is ensured.

In some embodiments, the controlling, based on a line chopper signal triggered to be generated by the data output control signal, the polarity of the offset voltage of the operational amplifier in the display device when the pixel driving mode signal is the first potential includes:

when the pixel driving mode signal is the first potential, changing, based on the line chopper signal triggered to be generated by the data output control signal, the polarity of the offset voltage of the operational amplifier in the display device in unit of two rows.

Figure 3:
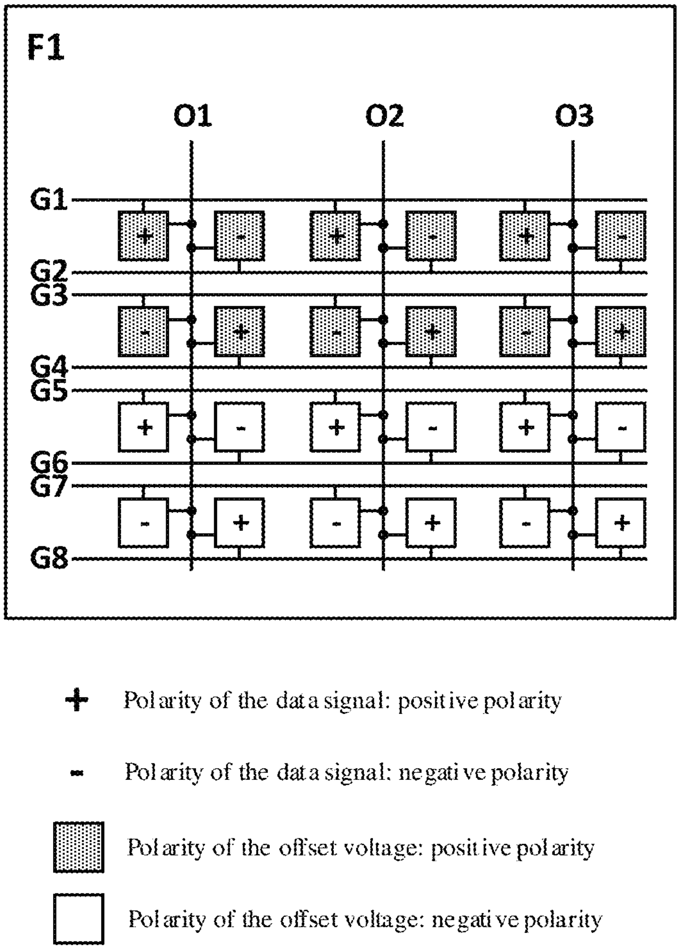
FIG. 3 is a schematic diagram of changing the polarity of the offset voltage based on the triggering of TP in unit of two rows when a pixel driving mode is frame inversion driving, according to an embodiment of the present application.

As shown in FIG. 3, the pixel driving mode in FIG. 3 is frame inversion driving, that is, the data signals of two adjacent pictures have opposite polarities. Based on the triggering of TP (data output control signal), the polarity of the offset voltage is changed in unit of two rows.

FIG. 3 shows only one picture, but the control method for other pictures is the same as that for one picture shown in FIG. 3. In FIG. 3, F1 represents the first frame. It can be seen from FIG. 3 that the data signals of the first row of pixels and the second row of pixels have opposite polarities, the data signals of the second row of pixels and the third row of pixels have opposite polarities, and the data signals of the third row of pixels and the fourth row of pixels have opposite polarities. G1 to G8 represent the first grid line to the eighth grid line, and O1 to O3 represent the first data line to the third data line.

In FIG. 3, "+" represents that the polarity of the data signal of the pixel is positive polarity, "−" represents that the polarity of the data signal of the pixel is negative polarity, ▒ represents that polarity of the offset voltage is positive polarity, and □ represents that the polarity of the offset voltage is negative polarity. The positive polarity and the negative polarity are relative, the absolute value of the numerical value of the data signal is equal, and the absolute value of the voltage value of the offset voltage is equal.

With reference to FIG. 3, the offset voltage of the first row and the offset voltage of the second row have the same polarity, and the offset voltage of the third row and the offset voltage of the fourth row have the same polarity. The offset voltage of "the first row and the second row" and the offset voltage of "the third row and the fourth row" have opposite polarities, i.e., the polarity of the offset voltage of the operational amplifier in the display device is changed in unit of two rows.

It can be seen from FIG. 3 that, in the first row of pixels and the third row of pixels, when the data signals of the pixels have the same polarity, the polarity of the offset voltage is opposite; and in the second row of pixels and the fourth row of pixels, when the data signals of the pixels have the same polarity, the polarity of the offset voltage is opposite. By chopper control, the offset voltage is equivalently eliminated within the design space range, that is, the offset voltage is balanced within the design space range, thereby realizing the spatial balancing effect and ensuring the display effect.

Of course, in some other embodiments, when the pixel driving mode signal is the first potential, that is, when the pixel driving mode is frame inversion driving, the polarity of the offset voltage of the operational amplifier in the display device is changed in unit of another number of rows (e.g., one row, three rows, four rows, five rows, six rows, etc.) based on the line chopper signal triggered to be generated by the data output control signal, as long as the polarity of the offset voltage of the operational amplifier is opposite when the data signals of pixels in different rows in the same frame have the same polarity. This will not be limited in the present application.

In some embodiments, when the pixel driving mode signal is the second potential, the polarity of the offset voltage of the operational amplifier in the display device is controlled based on the line chopper signal triggered to be generated by the polarity inversion control signal, so that the polarity of the offset voltage of the operational amplifier is opposite when the data signals of pixels at the same position in different frames have the same polarity, and the polarity of the offset voltage of the operational amplifier is opposite when the data signals of pixels in different rows in the same frame have the same polarity.

Figure 4A:
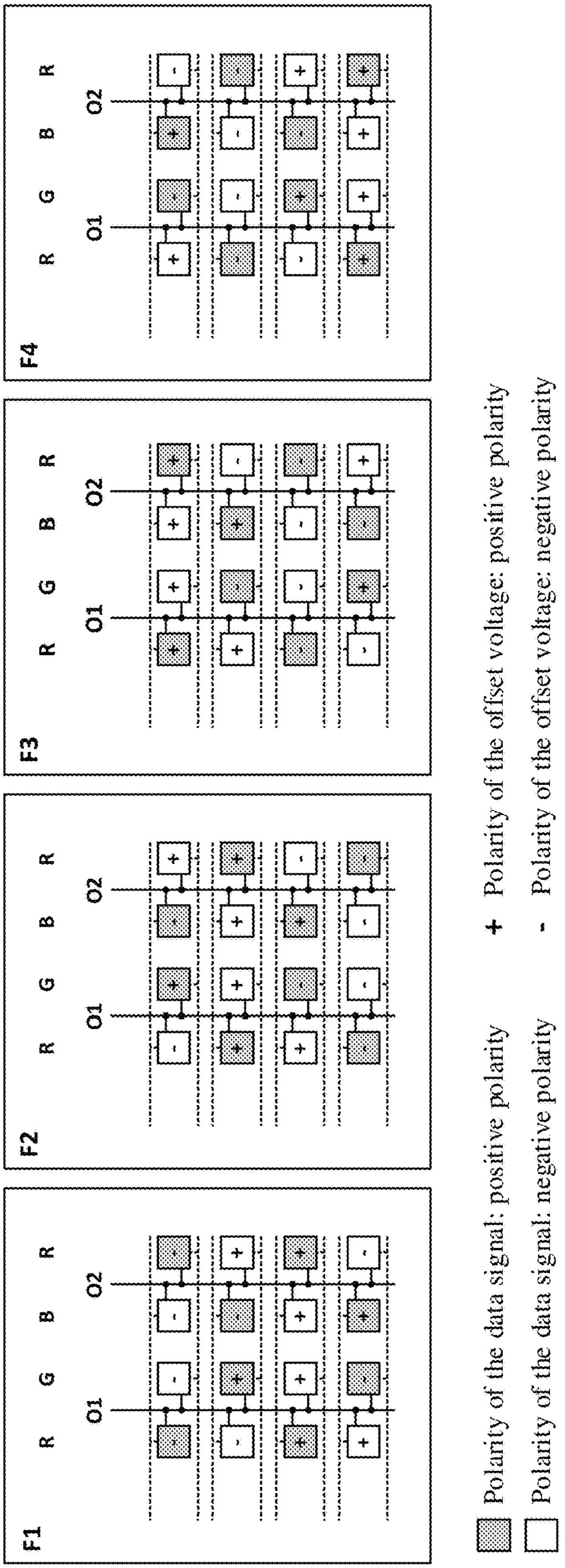
FIG. 4*a* is a schematic diagram of changing the polarity of the offset voltage based on the triggering of the rising edge of POL when a pixel driving mode is line inversion driving, according to an embodiment of the present application.

As shown in FIG. 4*a*, the pixels in FIG. 4*a* is arranged into a dual-grid structure, and two-line inversion driving is adopted. It can be seen from FIG. 4*a* that each row of sub-pixels is electrically connected to two grid lines, and each data line is electrically connected to two adjacent columns of sub-pixels. For example, the first column of sub-pixels and the second column of sub-pixels are electrically connected to the first data line O1, and located on two sides of the first data line O1. The third column of sub-pixels and the fourth column of sub-pixels are electrically connected to the second data line O2, and located on two sides of the second data line O2. In one picture, the inversion driving of the polarity of the data signals of the pixels is performed in unit of two data lines (i.e., four columns of sub-pixels electrically connected to two data lines).

Figure 5:
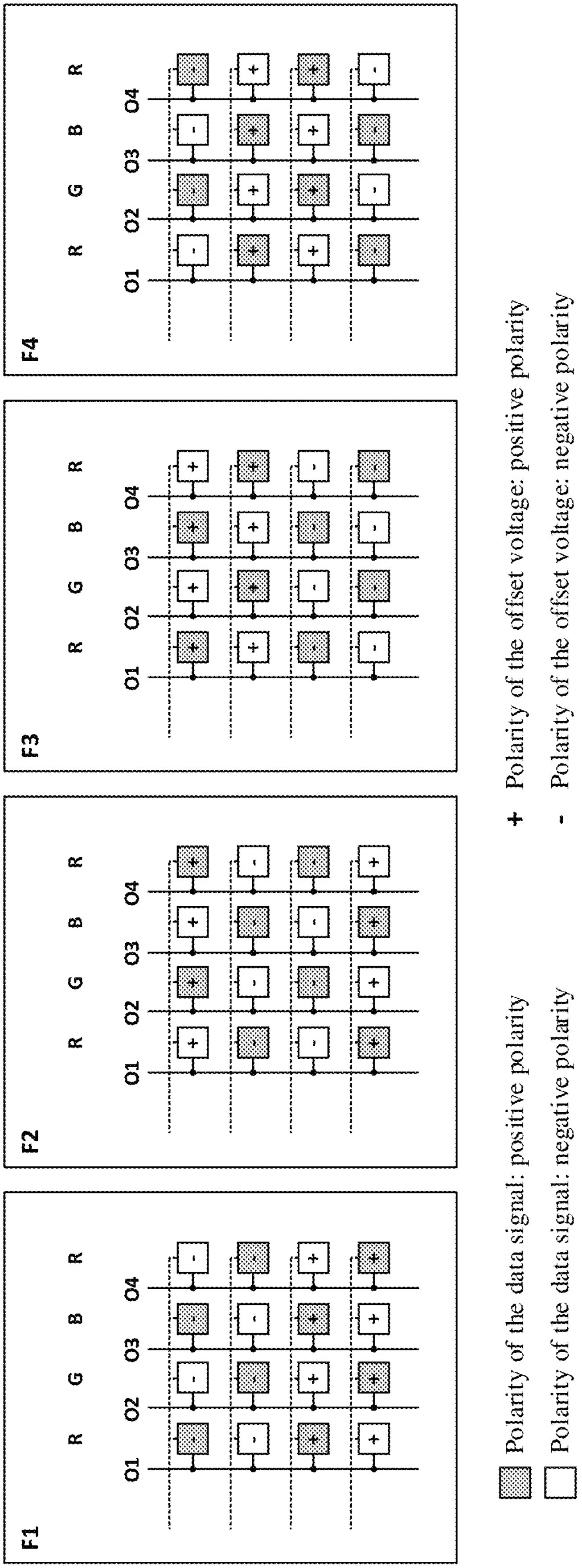
FIG. 5 is a schematic diagram of changing the polarity of the offset voltage based on the triggering of the rising edge of POL when another pixel driving mode is line inversion driving, according to an embodiment of the present application.

As shown in FIG. 5, the pixels in FIG. 5 are arranged into a single-grid structure, and single-line inversion driving is adopted. It can be seen from FIG. 5 that each row of sub-pixels is electrically connected to one grid line, and each data line is electrically connected to one column of sub-pixels. For example, the first column of sub-pixels is electrically connected to the first data line O1, and located on one side of the first data line O1. In one picture, the inversion driving of the polarity of the data signals of the pixels is performed in unit of one data line (i.e., one column of sub-pixels electrically connected to one data line).

In FIGS. 4*a* and 5, F1, F2, F3 and F4 represent the first frame, the second frame, the third frame and the fourth frame, respectively; and, O1 to 04 represent the first data line to the fourth data line. R, G and B represent that one column of sub-pixels is red sub-pixels, green sub-pixels and blue sub-pixels, respectively. As shown in FIGS. 4*a* and 5, the first column of sub-pixels is red sub-pixels, the second column of sub-pixels is green sub-pixels, the third column of sub-pixels is blue sub-pixels, and the fourth column of sub-pixels is red sub-pixels.

In FIGS. 4*a* and 5, ▨ represents that polarity of the data signal of the pixel is positive polarity, □ represents that the polarity of the data signal of the pixel is negative polarity, "+" represents that the polarity of the offset voltage is positive polarity, and "−" represents that the polarity of the offset voltage is negative polarity. The positive polarity and the negative polarity are relative, the absolute value of the numerical value of the data signal is equal, and the absolute value of the voltage value of the offset voltage is equal.

It can be seen from FIGS. 4*a* and 5 that, in the pictures of F1 and F3, when the data signals of pixels have the same polarity, the polarity of the offset voltage is opposite; and in the pictures of F2 and F4, when the data signals of pixels have the same polarity, the polarity of the offset voltage is opposite. By chopper control, the offset voltage is equivalently eliminated within the design time range, that is, the offset voltage is balanced within the design time range, thereby realizing the temporal balancing effect and ensuring the display effect.

Meanwhile, with reference to FIGS. 4*a* and 5, by taking the first frame F1 as an example, in one picture, in the picture of F1, for the first row of sub-pixels and the third row of sub-pixels, when the data signals of the pixels have the same polarity, the polarity of the offset voltage is opposite; and, for the second row of sub-pixels and the fourth row of sub-pixels, when the data signals of the pixels have the same polarity, the polarity of the offset voltage is opposite. By chopper control, the offset voltage is equivalently eliminated within the design space range, that is, the offset voltage is balanced within the design space range, thereby realizing the spatial balancing effect and ensuring the display effect.

In this embodiment, when the pixel driving mode is line inversion driving, the polarity of the offset voltage of the operational amplifier in the display device is controlled according to the line chopper signal triggered to be generated by the polarity inversion control signal, without using large-size transistors and providing more signals. By chopper control, the offset voltage is equivalently eliminated within both the design time range and the design space range, that is, the offset voltage is balanced in both the design time range and the design space range. Accordingly, the temporal and spatial balancing effects can be achieved, the display effect can be ensured, and the size of the chip can be reduced.

In some embodiments, the controlling, based on a line chopper signal triggered to be generated by the polarity inversion control signal, the polarity of the offset voltage of the operational amplifier in the display device when the pixel driving mode signal is the second potential includes:

in a line inversion system, changing, based on a line chopper signal triggered to be generated by a rising edge of the polarity inversion control signal, the polarity of the offset voltage of the operational amplifier in the display device.

Figure 4B:
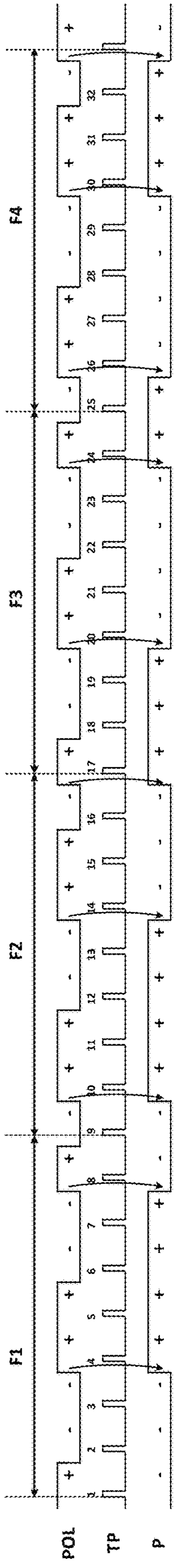
FIG. 4*b* is a timing sequence diagram of changing the polarity of the offset voltage based on the triggering of the rising edge of POL when a pixel driving mode is line inversion driving, according to an embodiment of the present application.

With reference to FIG. 4*b*, F1, F2, F3 and F4 represent the first frame, the second frame, the third frame and the fourth frame, respectively. TP represents the data output control signal, which is a signal received by the source driver and output from the timing sequence controller and is used to control the release of the data signal of the source driver to the display panel. POL represents the polarity inversion control signal, which is a signal received by the source driver and output from the timing sequence controller and controls the polarity of the data signal output by the source driver by switching between high and low potentials, so as to realize the AC driving of pixels. P represents the line chopper signal triggered to be generated by the rising edge of the polarity inversion control signal POL.

It can be seen from FIG. 4*b* that, based on the line chopper signal P triggered to be generated by the rising edge of the polarity inversion control signal POL, the potential of the line chopper signal P is changed when the POL is the rising edge. With reference to FIGS. 4*a* and 4*b*, the polarity of the offset voltage is changed based on the change of the potential of the line chopper signal P. For example, in F1, the first column of sub-pixels and the second column of sub-pixels are electrically connected to the first data line O1 and located on two sides of the first data line O1. That is, the first data line O1 is electrically connected to eight sub-pixels (one data line can control sub-pixels in left and right columns). The polarity (−−−++++− in FIG. 4*a*) of the offset voltage is changed based on the change of the potential (−−−++++− in FIG. 4*b*) of the line chopper signal P.

In this embodiment, the polarity of the offset voltage of the operational amplifier in the display device can be changed based on only the line chopper signal triggered to be generated by the rising edge of the polarity inversion control signal POL, so that the offset voltage can be balanced in both the design time range and the design space range, without using large-size transistors and providing more signals. Accordingly, the temporal and spatial balancing effects can be achieved, the display effect can be ensured, and the size of the chip can be reduced.

Figure 6:
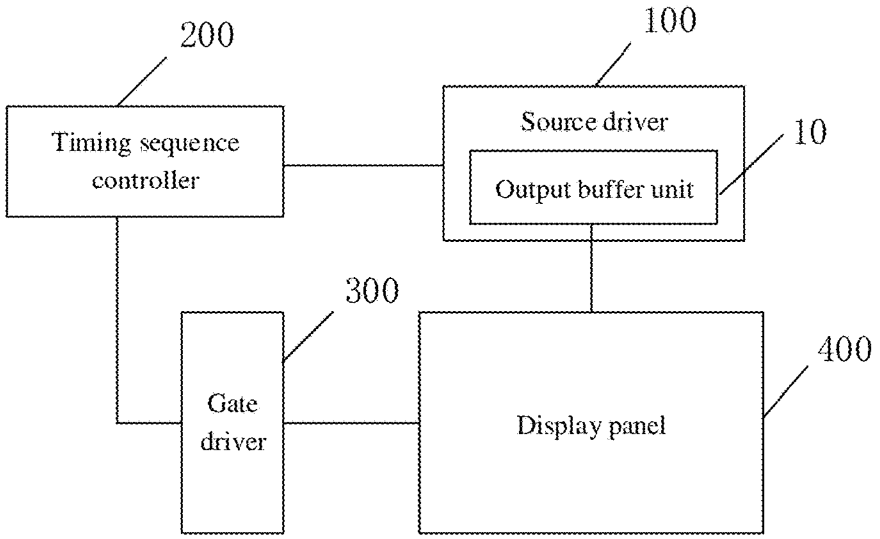
FIG. 6 is a schematic frame diagram of a display device according to an embodiment of the present application.
Figure 7:
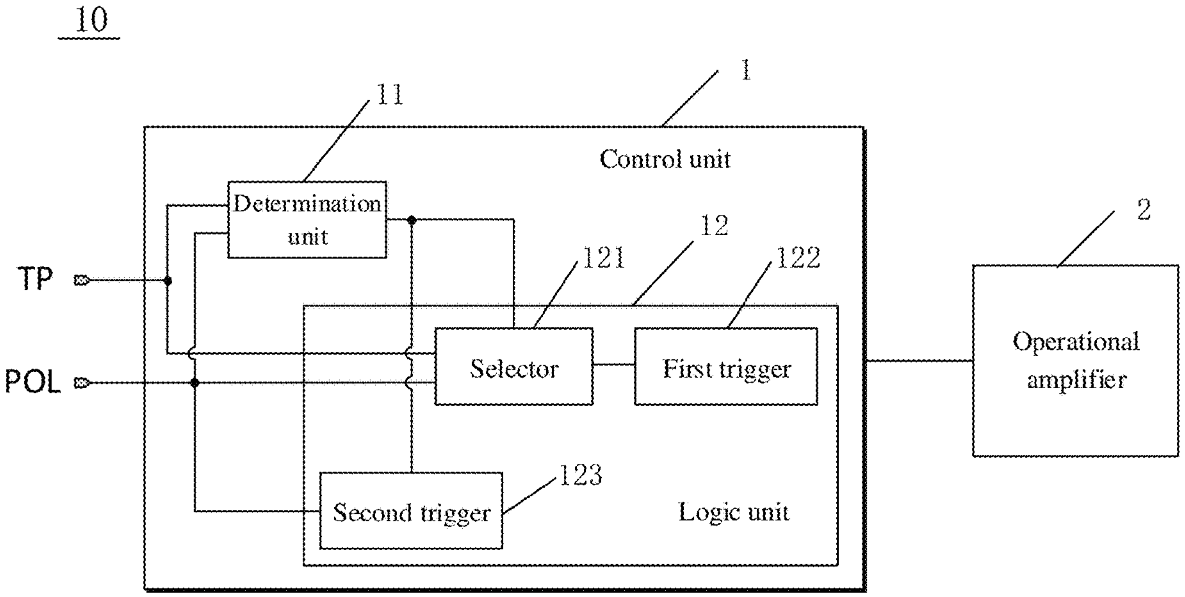
FIG. 7 is a schematic frame diagram of an output buffer unit according to an embodiment of the present application.

Based on the same inventive concept, as shown in FIGS. 6 and 7, an embodiment of the present application provides a display device, including a source driver 100 and a display panel 400. The display device may be a mobile phone, a tablet computer, a TV set, a display, a notebook computer, a digital photo frame, a navigator or any other products or components with a display function.

The source driver 100 includes an output buffer unit 10, which is electrically connected to the display panel 400.

The output buffer unit 10 includes a control unit 1 and an operational amplifier 2. The control unit 1 is electrically connected to the operational amplifier 2, and the control unit 1 is configured to execute the method for controlling an offset voltage in a display device provided in any one of the above embodiments.

Optionally, the output buffer unit 10 includes a plurality of operational amplifiers 2 (not shown) to output data signals.

In the display device provided in this embodiment of the present application, by proving the control unit 1, the polarity of the offset voltage of the operational amplifier 2 in the display device is controlled by using the chopper signal generated based on at least one of the data output control signal and the polarity inversion control signal, so that the offset voltage can be equivalently eliminated within at least one of the design space range and the design time range, without using large-size transistors and providing more signals. Accordingly, the display effect can be ensured, and the cost can also be reduced. Thus, the source driver 100 in the display device can be suitable for various interfaces, e.g., mLVDS interfaces.

Optionally, as shown in FIG. 6, the display device further includes a timing sequence controller 200 and a gate driver 300. The timing sequence controller 200 is electrically connected to both the source driver 100 and the gate driver 300.

The timing sequence controller 200 is configured to output a display signal and a source control signal to the source driver 100 and output a gate control signal to the gate driver 300.

The source control signal includes a data output control signal TP and a polarity inversion control signal POL.

The source driver 100 receives the display signal and the source control signal output from the timing sequence controller 200, and outputs a data signal corresponding to the display signal to the display panel 400 through a plurality of data lines. The display signal includes RGB data, and the data signal includes a gray-scale voltage signal.

In some embodiments, as shown in FIG. 7, the control unit 1 includes a determination unit 11 and a logic unit 12.

The determination unit 11 is configured to determine, based on the data output control signal and the polarity inversion control signal, a pixel driving mode signal in the display device, the pixel driving mode signal including a first potential and a second potential.

The logic unit 12 is electrically connected to the determination unit 11 and the operational amplifier and configured to: generate a chopper signal based on the pixel driving mode signal and at least one of the data output control signal and the polarity inversion control signal; and, control, according to the chopper signal, the polarity of the offset voltage of the operational amplifier in the display device, so that the offset voltage is equivalently eliminated within at least one of a design space range and a design time range.

Optionally, the determination unit 11 is further configured to determine the frequency of the polarity inversion control signal based on the data output control signal and the polarity inversion control signal.

Optionally, the determination unit 11 determines the pixel driving mode signal based on the data output control signal and the polarity inversion control signal and according to the result of determination whether it is single-line inversion driving, two-line inversion driving or four-line inversion driving.

Optionally, when the pixel driving mode signal is the first potential, the pixel driving mode is frame inversion driving; and, when the pixel driving mode signal is the second potential, the pixel driving mode is line inversion driving.

Optionally, the first potential may be a high potential or a low potential; and correspondingly, the second potential may be a low potential or a high potential. For example, the first potential may be a digital potential of 1; and correspondingly, the second potential may be a digital potential of 0. Of course, the first potential may also be 0.8 or 0.7; and correspondingly, the second potential may also be 0.2 or 0.1. This will not be specifically limited in the present application.

In this embodiment of the present application, by providing the determination unit 11 and the logic unit 12, different pixel driving modes (e.g., frame inversion driving or line inversion driving) are adapted, and different methods are adopted in different pixel driving modes to control the polarity of the offset voltage of the operational amplifier 2 in the display device, so that the offset voltage is equivalently eliminated within at least one of the design space range and the design time range, and the display effect is ensured.

In some embodiments, as shown in FIG. 7, the determination unit is further configured to determine the frequency of the polarity inversion control signal based on the data output control signal and the polarity inversion control signal.

The logic unit 12 includes a selector 121, a first trigger 122 and a second trigger 123.

The selector 121 is electrically connected to the determination unit 11 and configured to receive the data output control signal and the polarity inversion control signal and selectively output the data output control signal or the polarity inversion control signal based on the pixel driving mode signal.

The first trigger 122 is electrically connected to the selector 121 and configured to trigger to generate a line chopper signal based on the data output control signal or polarity inversion control signal output by the selector.

The second trigger 123 is electrically connected to the determination unit 11 and configured to receive the polarity inversion control signal and trigger to generate a frame chopper signal based on the pixel driving mode signal.

Figure 8:
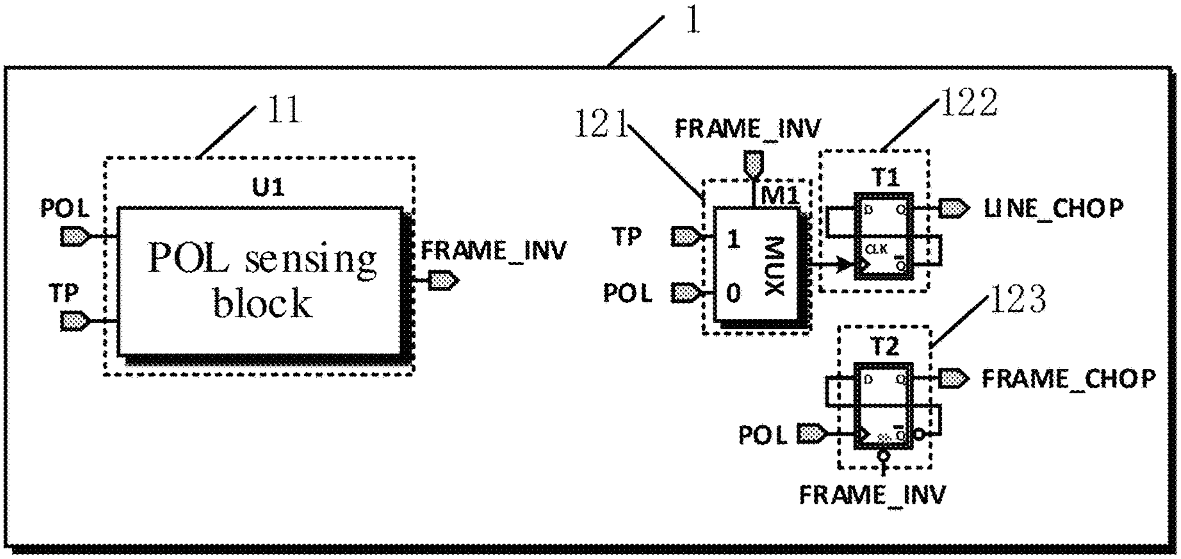
FIG. 8 is a schematic circuit diagram of a control unit according to an embodiment of the present application.

In one example, as shown in FIG. 8, the determination unit 11 includes a POL sensing block U1, the selector 121 includes a selector (MUX, multiplexer) M1, the first trigger 122 includes a trigger T1, and the second trigger 123 includes a trigger T2.

Specifically, in FIG. 8, the POL sensing block U1 is configured to determine the pixel driving mode signal FRAME_INV in the display device based on the data output control signal TP and the polarity inversion control signal POL, the pixel driving mode signal FRAME_INV including a first potential (e.g., a digital potential "1") and a second potential (e.g., a digital potential "0"). The POL sensing block U1 is further configured to determine the frequency of the polarity inversion control signal POL based on the data output control signal TP and the polarity inversion control signal POL.

In FIG. 8, both the input terminal of the selector M1 and the enabling terminal Rb of the trigger T2 receive the pixel driving mode signal FRAME_INV output by the POL sensing block U1.

Both the trigger T1 and the trigger T2 are D triggers.

The selector M1 is electrically connected to the block terminal CLK of the trigger T1.

The reverse output terminal Q of the trigger T1 is electrically connected to the input terminal D, and the output terminal Q of the trigger T1 is configured to output the line chopper signal LINE_CHOP.

The reverse output terminal Q of the trigger T2 is electrically connected to the input terminal D, and the output terminal Q of the trigger T2 is configured to output the frame chopper signal FRAME_CHOP.

As shown in FIG. 8, in a first situation, when the pixel driving mode signal FRAME_INV is the first potential (high potential), the pixel driving mode is frame inversion driving, and both the selector M1 and the trigger T2 operate. The selector M1 selectively output the data output control signal TP to the trigger T1, and the trigger T1 triggers to generate the line chopper signal LINE_CHOP based on the data output control signal TP. Meanwhile, the trigger T2 triggers to generate the frame chopper signal FRAME_CHOP based on the polarity inversion control signal POL.

When the pixel driving mode is frame inversion driving, the frequency of the polarity inversion control signal POL is determined by the POL sensing block U1, the frequency of the polarity inversion control signal POL is used as the frame-to-frame frequency, and the polarity of the offset voltage of the operational amplifier 2 in the display device is controlled based on the frame chopper signal FRAME_CHOP triggered to be generated by the polarity inversion control signal POL and according to the frame-to-frame frequency, so that the polarity of the offset voltage of the operational amplifier 2 is opposite when the data signals of pixels at the same position in different frames have the same polarity. Thus, the offset voltage is equivalently eliminated within the design time range, the temporal balancing effect is realized, and the display effect is ensured.

When the pixel driving mode is frame inversion driving, the polarity of the offset voltage of the operational amplifier 2 in the display device is controlled based on the line chopper signal LINE_CHOP triggered to be generated by the data output control signal TP, so that the polarity of the offset voltage of the operational amplifier 2 is opposite when the data signals of pixels in different rows in the same frame have the same polarity. Thus, the offset voltage is equivalently eliminated within the design space range, the spatial balancing effect is realized, and the display effect is ensured.

As shown in FIG. 8, in a second situation, when the pixel driving mode signal FRAME_INV is the second potential (low potential), the pixel driving mode is line inversion driving, the selector M1 operates, and the trigger T2 does not operate. The selector M1 selectively output the polarity inversion control signal POL to the trigger T1, and the trigger T1 triggers to generate the line chopper signal LINE_CHOP based on the polarity inversion control signal POL.

When the pixel driving mode is line inversion driving, the polarity of the offset voltage of the operational amplifier 2 in the display device is controlled based on the line chopper signal LINE_CHOP (for example, the LINE_CHOP is the P signal in FIG. 4*b* in this case) triggered to be generated by the rising edge of the polarity inversion control signal POL, so that the polarity of the offset voltage of the operational amplifier 2 is opposite when the data signals of pixels at the same position in different frames have the same polarity, and the polarity of the offset voltage of the operational amplifier 2 is opposite when the data signals of pixels in different rows in the same frame have the same polarity. Thus, the offset voltage is equivalently eliminated within both the design time range and the design space range, the temporal and spatial balancing effects are realized, and the display effect is ensured.

The display device provided in this embodiment of the present application can adapt to different pixel driving modes (e.g., frame inversion driving or line inversion driving), and different chopper control methods are adopted in different pixel driving modes to control the polarity of the offset voltage of the operational amplifier 2 in the display device. Thus, without using large-size transistors and proving more signals, the offset voltage can be equivalently eliminated within at least one of the design space range and the design time range, and the display effect is ensured.

Based on the same inventive concept, an embodiment of the present application provides a computer-readable storage medium having computer programs stored thereon that are executed by a computer to implement the method for controlling an offset voltage in a display device provided in any one of the above embodiments.

The computer-readable storage medium provided in this embodiment of the present application has the same inventive concept and the same beneficial effects as the above embodiments, and the content not detailed in the computer-readable storage medium can refer to the above embodiments and will not be repeated here.

The computer-readable medium of the present application may be a computer-readable signal medium, a computer-readable storage medium or any combination of the both. For example, the computer-readable storage medium may be, but not be limited to: electrical, magnetic, optical, electromagnetic, infrared or semiconductor systems, apparatuses or devices, or any combination thereof. More specific examples of the computer-readable storage medium may include, but not limited to: electrical connections having one or more leads, portable computer disks, hard disks, random access memories (RAMs), read only memories (ROMs), erasable programmable read only memories (EPROMs), optical fibers, portable compact disc read only memories (CD-ROMs), optical storage devices, magnetic storage devices or any suitable combinations thereof.

In the present application, the computer-readable storage medium may be any tangible medium containing or storing computer programs. The compute programs may be used by or with an instruction execution system, apparatus or device. In the present application, the computer-readable signal medium may include data signals propagated in basebands or as part of carriers, in which computer-readable computer program codes are carried. The propagated data signals may be in various forms, including but not limited to electromagnetic signals, optical signals or any suitable combination thereof. The computer-readable signal medium may also be any computer-readable medium except for computer-readable storage mediums. The computer-readable signal medium may send, propagate or transmit computer programs for use by or with an instruction execution system, apparatus or device. The computer program codes contained in the computer-readable medium may be transmitted by any suitable medium, including but not limited to: wires, optical cables, RF, or any suitable combination thereof.

By applying the embodiments of the present application, at least the following beneficial effects can be achieved.

(1) In the method for controlling an offset voltage in a display device and the display device provided in the embodiments of the present application, the polarity of the offset voltage of the operational amplifier in the display device is controlled by using the chopper signal generated based on at least one of the data output control signal and the polarity inversion control signal, so that the offset voltage can be equivalently eliminated within at least one of the design space range and the design time range, without using large-size transistors and providing more signals. Accordingly, the display effect can be ensured, and the size of the chip can also be reduced. Thus, the source driver in the display device can be suitable for various interfaces, e.g., mLVDS interfaces.

(2) The control method and the display device provided in the embodiments of the present application can adapt to different pixel driving modes (e.g., frame inversion driving or line inversion driving), and different chopper control methods are adopted in different pixel driving modes to control the polarity of the offset voltage of the operational amplifier 2 in the display device. Thus, without using large-size transistors and proving more signals, the offset voltage can be equivalently eliminated within at least one of the design space range and the design time range, and the display effect is ensured.

It should be understood by those skilled in the art that the steps, measures and solutions in the operations, methods and flows already discussed in the present application can be alternated, changed, combined or deleted. Further, other steps, measures and solutions in the operations, methods and flows already discussed in the present application can also be alternated, changed, rearranged, decomposed, combined or deleted. Further, the steps, measures and solutions of the prior art in the operations, methods and operations disclosed in the present application can also be alternated, changed, rearranged, decomposed, combined or deleted.

The terms "first" and "second" are merely for illustrative purpose, and should not be interpreted as indicating or implying the relative importance or implicitly indicating the number of the specified technical features. Therefore, the features defined by the terms "first" and "second" can explicitly or implicitly include one or more features. Unless otherwise stated, in the description of the present invention, "a plurality of" means two or more.

It should be understood that, although the steps in the flowcharts in the accompanying drawings are shown sequentially as indicated by arrows, these steps are not necessarily executed sequentially in the order indicated by the arrows. Unless otherwise clearly stated herein, the execution of these steps is not limited to a strict order and these steps may be executed in other orders. Furthermore, at least some of the steps in the flowcharts of the accompanying drawings may include a plurality of sub-steps or a plurality of sub-stages. These sub-steps or sub-stages may be executed at different moments rather than at a same moment. These sub-steps or sub-stages are not necessarily executed sequentially, and instead, they may be executed in turn or alternately with other steps or with at least some of sub-steps or sub-stages of other steps.

The foregoing description merely shows some implementations of the present application. It should be pointed out that, to those skilled in the art, various improvements and modifications can be made without departing from the principle of the present application, and these improvements and modifications shall be deemed as falling into the protection scope of the present application.

What is claimed is:

1. A method for controlling an offset voltage in a display device, comprising:

generating a chopper signal based on at least one of a data output control signal and a polarity inversion control signal; and controlling, according to the chopper signal, the polarity of an offset voltage of an operational amplifier in the display device, so that the offset voltage is equivalently eliminated within at least one of a design space range and a design time range, wherein the generating the chopper signal based on at least one of the data output control signal and the polarity inversion control signal comprises:

determining, based on the data output control signal and the polarity inversion control signal, a pixel driving mode signal in the display device, the pixel driving mode signal comprising a first potential and a second potential; and generating the chopper signal based on the pixel driving mode signal and at least one of the data output control signal and the polarity inversion control signal, and wherein the controlling, according to the chopper signal, the polarity of the offset voltage of the operational amplifier in the display device comprises:

when the pixel driving mode signal is the first potential, controlling, based on a frame chopper signal triggered to be generated by the polarity inversion control signal, the polarity of the offset voltage of the operational amplifier in the display device, and controlling, based on a line chopper signal triggered to be generated by the data output control signal, the polarity of the offset voltage of the operational amplifier in the display device, and when the pixel driving mode signal is the second potential, controlling, based on the line chopper signal triggered to be generated by the polarity inversion control signal, the polarity of the offset voltage of the operational amplifier in the display device.

2. The method for controlling the offset voltage in the display device according to claim 1, wherein the generating the chopper signal based on at least one of the data output control signal and the polarity inversion control signal further comprises:

determining a frequency of the polarity inversion control signal based on the data output control signal and the polarity inversion control signal.

3. The method for controlling the offset voltage in the display device according to claim 1, wherein the controlling, based on the frame chopper signal triggered to be generated by the polarity inversion control signal, the polarity of the offset voltage of the operational amplifier in the display device when the pixel driving mode signal is the first potential comprises:

when the pixel driving mode signal is the first potential, controlling, based on the frame chopper signal triggered to be generated by the polarity inversion control signal and according to a frequency of the polarity inversion control signal, the polarity of the offset voltage of the operational amplifier in the display device, so that the polarity of the offset voltage of the operational amplifier is opposite when data signals of pixels at the same position in different frames have the same polarity.

4. The method for controlling the offset voltage in the display device according to claim 3, wherein the controlling, based on the frame chopper signal triggered to be generated by the polarity inversion control signal and according to the frequency of the polarity inversion control signal, the polarity of the offset voltage of the operational amplifier in the display device when the pixel driving mode signal is the first potential comprises:

when the pixel driving mode signal is the first potential, changing, based on the frame chopper signal triggered to be generated by the polarity inversion control signal and according to the frequency of the polarity inversion control signal, the polarity of the offset voltage of the operational amplifier in the display device in unit of two frames.

5. The method for controlling the offset voltage in the display device according to claim 1, wherein the controlling, based on the line chopper signal triggered to be generated by the data output control signal, the polarity of the offset voltage of the operational amplifier in the display device when the pixel driving mode signal is the first potential comprises:

when the pixel driving mode signal is the first potential, controlling, based on the line chopper signal triggered to be generated by the data output control signal, the polarity of the offset voltage of the operational amplifier in the display device, so that the polarity of the offset voltage of the operational amplifier is opposite when data signals of pixels in different rows in the same frame have the same polarity.

6. The method for controlling the offset voltage in the display device according to claim 5, wherein the controlling, based on the line chopper signal triggered to be generated by the data output control signal, the polarity of the offset voltage of the operational amplifier in the display device when the pixel driving mode signal is the first potential comprises:

when the pixel driving mode signal is the first potential, changing, based on the line chopper signal triggered to be generated by the data output control signal, the polarity of the offset voltage of the operational amplifier in the display device in unit of two rows.

7. The method for controlling the offset voltage in the display device according to claim 1, wherein, when the pixel driving mode signal is the second potential, controlling, based on the line chopper signal triggered to be generated by the polarity inversion control signal, the polarity of the offset voltage of the operational amplifier in the display device, so that the polarity of the offset voltage of the operational amplifier is opposite when data signals of pixels at the same position in different frames have the same polarity, and the polarity of the offset voltage of the operational amplifier is opposite when data signals of pixels in different rows in the same frame have the same polarity.

8. The method for controlling the offset voltage in the display device according to claim 7, wherein the controlling, based on the line chopper signal triggered to be generated by the polarity inversion control signal, the polarity of the offset voltage of the operational amplifier in the display device when the pixel driving mode signal is the second potential comprises:

in a line inversion system, changing, based on the line chopper signal triggered to be generated by a rising edge of the polarity inversion control signal, the polarity of the offset voltage of the operational amplifier in the display device.

9. A display device, comprising a source driver and a display panel;

the source driver comprises an output buffer unit, which is electrically connected to the display panel; and the output buffer unit comprises a control unit and an operational amplifier, the control unit being electrically connected to the operational amplifier, the control unit being configured to execute a method for controlling an offset voltage in the display device comprising:

generating a chopper signal based on at least one of a data output control signal and a polarity inversion control signal; and controlling, according to the chopper signal, the polarity of an offset voltage of an operational amplifier in the display device, so that the offset voltage is equivalently eliminated within at least one of a design space range and a design time range, wherein the control unit comprises:

a determination unit, configured to determine, based on the data output control signal and the polarity inversion control signal, a pixel driving mode signal in the display device, the pixel driving mode signal comprising a first potential and a second potential; and a logic unit, which is electrically connected to the determination unit and the operational amplifier and configured to: generate the chopper signal based on the pixel driving mode signal and at least one of the data output control signal and the polarity inversion control signal; and, control, according to the chopper signal, the polarity of the offset voltage of the operational amplifier in the display device, so that the offset voltage is equivalently eliminated within at least one of the design space range and the design time range, wherein the controlling, according to the chopper signal, the polarity of the offset voltage of the operational amplifier in the display device comprises:

when the pixel driving mode signal is the first potential, controlling, based on a frame chopper signal triggered to be generated by the polarity inversion control signal, the polarity of the offset voltage of the operational amplifier in the display device, and controlling, based on a line chopper signal triggered to be generated by the data output control signal, the polarity of the offset voltage of the operational amplifier in the display device, and when the pixel driving mode signal is the second potential, controlling, based on the line chopper signal triggered to be generated by the polarity inversion control signal, the polarity of the offset voltage of the operational amplifier in the display device.

10. The display device according to claim 9, wherein, the determination unit is further configured to determine a frequency of the polarity inversion control signal based on the data output control signal and the polarity inversion control signal;

the logic unit comprises a selector, a first trigger and a second trigger;

the selector is electrically connected to the determination unit and configured to receive the data output control signal and the polarity inversion control signal and selectively output the data output control signal or the polarity inversion control signal based on the pixel driving mode signal;

the first trigger is electrically connected to the selector and configured to trigger to generate the line chopper signal based on the data output control signal or polarity inversion control signal output by the selector; and the second trigger is electrically connected to the determination unit and configured to receive the polarity inversion control signal and trigger to generate the frame chopper signal based on the pixel driving mode signal.

11. A non-transitory computer-readable storage medium having computer programs stored thereon that are executed by a computer to implement a method for controlling an offset voltage in a display device comprising:

generating a chopper signal based on at least one of a data output control signal and a polarity inversion control signal; and controlling, according to the chopper signal, the polarity of an offset voltage of an operational amplifier in the display device, so that the offset voltage is equivalently eliminated within at least one of a design space range and a design time range, wherein the generating the chopper signal based on at least one of the data output control signal and the polarity inversion control signal comprises:

determining, based on the data output control signal and the polarity inversion control signal, a pixel driving mode signal in the display device, the pixel driving mode signal comprising a first potential and a second potential; and generating the chopper signal based on the pixel driving mode signal and at least one of the data output control signal and the polarity inversion control signal, and wherein the controlling, according to the chopper signal, the polarity of the offset voltage of the operational amplifier in the display device comprises:

when the pixel driving mode signal is the first potential, controlling, based on a frame chopper signal triggered to be generated by the polarity inversion control signal, the polarity of the offset voltage of the operational amplifier in the display device, and controlling, based on a line chopper signal triggered to be generated by the data output control signal, the polarity of the offset voltage of the operational amplifier in the display device, and when the pixel driving mode signal is the second potential, controlling, based on the line chopper signal triggered to be generated by the polarity inversion control signal, the polarity of the offset voltage of the operational amplifier in the display device.

12. The non-transitory computer-readable storage medium according to claim 11, wherein the generating the chopper signal based on at least one of the data output control signal and the polarity inversion control signal further comprises:

determining a frequency of the polarity inversion control signal based on the data output control signal and the polarity inversion control signal.

13. The non-transitory computer-readable storage medium according to claim 11, wherein the controlling, based on the frame chopper signal triggered to be generated by the polarity inversion control signal, the polarity of the offset voltage of the operational amplifier in the display device when the pixel driving mode signal is the first potential comprises:

when the pixel driving mode signal is the first potential, controlling, based on the frame chopper signal triggered to be generated by the polarity inversion control signal and according to a frequency of the polarity inversion control signal, the polarity of the offset voltage of the operational amplifier in the display device, so that the polarity of the offset voltage of the operational amplifier is opposite when data signals of pixels at the same position in different frames have the same polarity.

14. The non-transitory computer-readable storage medium according to claim 13, wherein the controlling, based on the frame chopper signal triggered to be generated by the polarity inversion control signal and according to the frequency of the polarity inversion control signal, the polarity of the offset voltage of the operational amplifier in the display device when the pixel driving mode signal is the first potential comprises:

when the pixel driving mode signal is the first potential, changing, based on the frame chopper signal triggered to be generated by the polarity inversion control signal and according to the frequency of the polarity inversion control signal, the polarity of the offset voltage of the operational amplifier in the display device in unit of two frames.

15. The non-transitory computer-readable storage medium according to claim 11, wherein the controlling, based on the line chopper signal triggered to be generated by the data output control signal, the polarity of the offset voltage of the operational amplifier in the display device when the pixel driving mode signal is the first potential comprises:

when the pixel driving mode signal is the first potential, controlling, based on the line chopper signal triggered to be generated by the data output control signal, the polarity of the offset voltage of the operational amplifier in the display device, so that the polarity of the offset voltage of the operational amplifier 1*s* opposite when data signals of pixels in different rows in the same frame have the same polarity.

* * * * *